INVENTOR
H. SEIDEL
BY Sylvan Sherman
ATTORNEY

Feb. 4, 1969 H. SEIDEL 3,426,292

PHASE-COHERENT BAND-SPLITTING AND RECOMBINATION NETWORK

Filed Nov. 18, 1965 Sheet 2 of 5

3,426,292
PHASE-COHERENT BAND-SPLITTING AND RECOMBINATION NETWORK

Harold Seidel, Fanwood, N.J., assignor to Bell Telephone Laboratories, Incorporated, New York, N.Y., a corporation of New York Filed Nov. 18, 1965, Ser. No. 508,497
U.S. Cl. 330—126 10 Claims
Int. Cl. H03f 3/68

ABSTRACT OF THE DISCLOSURE

This application treats the practical problem of how to process a signal whose bandwidth exceeds that of the available equipment. As described herein, the input signal is successively divided into pairs of partially overlapping subbands which share frequency components in common. In order that the subbands, upon recombining, preserve the proper phase coherency necessary to reproduce the original signal, the phase shift through the network is adjusted such that the relative phase shift experienced by the frequency components common to pairs of subbands is zero.

This invention relates to phase-coherent band-splitting and recombining networks.

There often exists a practical problem of processing a frequency band of information in equipment of inadequate bandwidth. This problem should not be confused with the related, but different problem, of dropping separate channels in a multichannel system, and individually processing the separate channels. In this latter situation, the individual channels are separated by guard channels and there is no inter-channel phase coherency requirement placed upon the system. By contrast, the present invention is directed to the problem of splitting and recombining the frequencies within a particular channel into two, partially overlapping subbands in a manner to preserve the phase relationships among the respective frequencies in the two subbands so as to conserve the information contained therein.

The present invention employs a basic property of matched, lossless four-ports which is their ability to divide an incident signal into two parts, and then to recombine the two parts in a manner to recover the incident signal provided the total phase shifts experienced by the two signal components, while propagating between the input terminal and the output terminal, are the same.

Where only one four-port is used, a signal applied to one branch of the four-port recombines in that one branch provided the divided signal components are reflected back to the four-port with proper phase.

In accordance with the present invention, two interconnected four-port filters are used so as to separate the input branch of a band-splitting and recombining network from the output branch. The signal is applied to one branch of one four-port wherein it is divided into two, partially overlapping subbands. The recombined signal is taken from the corresponding branch of the second four-port.

In general, there are two broad classes of four-ports. In the first, the divided signal components are either in phase, or 180 degrees out of phase. Four-ports of this class require no additional phase shift in order to recombine the signal components properly. In the second class of four-ports, the divided signal components are 90 degrees out of phase. These are the so-called "quadrature" four-ports. For this class of four-port, an additional 180 degrees of phase shift must be introduced into the wavepath of one of the signal components in order to realize equal overall phase shifts for the two signal components at all frequencies. This property was also pointed out in a different context by E. A. J. Marcatili et al. in United States Patent 3,184,691. As noted in this patent, an additional 180 degree phase shift included between quadrature power-dividers has the property of greatly improving the frequency response of the system. In this manner, phase can be coherently specified in a multiple splitting process, and spurious fading avoided. Moreover, all of the energy which is processed is retrieved.

In a first illustrative embodiment of the invention, signal splitting and recombination are produced by means of two quadrature four-port filters. Corresponding branches of the filters are interconnected by means of a pair of wavepaths which include amplifiers, or other devices, for separately processing the information in the two subbands. An additional 180 degree phase shift is added to one of the wavepaths.

Additional illustrative embodiments are included to show the manner in which a band of information can be split into three or more separate subbands and subsequently recombined without suffering any phase disparity.

These and other objects and advantages, the nature of the present invention, and its various features, will appear more fully upon consideration of the various illustrative embodiments now to be described in detail in connection with the accompanying drawings, in which.

Figure 1:
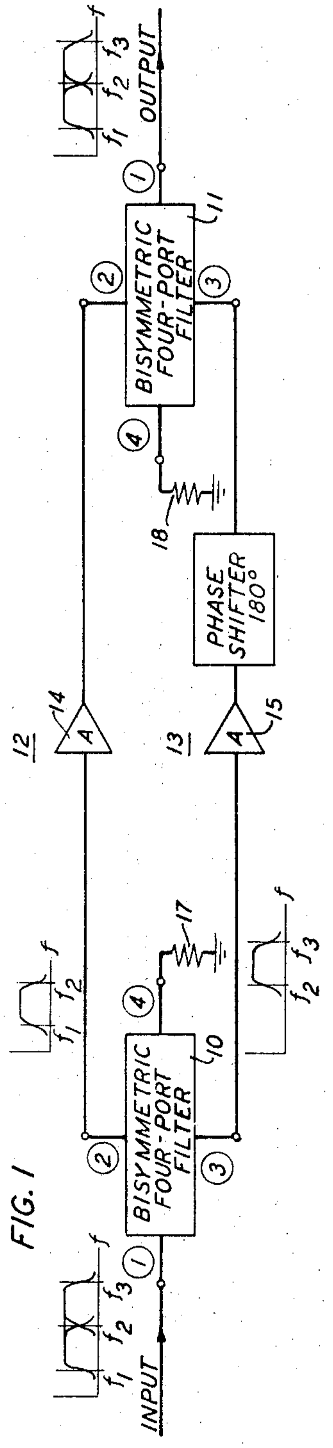
FIG. 1 is a first embodiment of a band-splitting and recombining network in accordance with the invention.

Referring to the drawings, FIG. 1 is a block diagram of a first illustrative embodiment of a band-splitting and recombining network in accordance with the present invention. As illustrated, the network comprises two bisymmetric four-port filters 10 and 11, interconnected by means of a pair of wavepaths 12 and 13. More particularly, wavepath 12, which includes an amplifier 14, connects port 2 of filter 10 to port 2 of filter 11. Similarly, wavepath 13, which includes a second amplifier 15 and a 180 degree phase shifter 16, connects port 3 of filter 10 to port 3 of filter 11. Port 4 of filter 10 and port 4 of filter 11 are match-terminated by means of dissipative terminations 17 and 18. The input signal is introduced into port 1 of filter 10 and the output signal obtained from port 1 of filter 11.

In the embodiment of FIG. 1, and in the several other embodiment to be described hereinbelow, the four-port filters are always used in pairs of identical filters for the purpose of first dividing a signal into two subbands and then, after processing the subbands in some manner, recombining them. Accordingly, in the discussion to follow, these filters will be referred to as either "band-splitters" or "band-recombiners," where such a designation would help in an understanding of the operation of the circuit. Alternatively, they may be referred to more generally as "filters" or as "four-port filters" for the purpose of cataloging circuit elements in a particular illustrative embodiment.

The purpose of the band-splitting and recombining network of FIG. 1 is to permit the processing of broadband signals in equipment of inadequate bandwidth. For example, in the illustrative embodiment of FIG. 1, the function of amplification is performed by amplifiers 14 and 15, where each of the amplifiers itself would be incapable of amplifying the entire frequency spectrum occupied by the applied signal. By splitting the spectrum, however, it is reduced to two, partially overlapping spectra, each of which is within the frequency handling capabilities of the respective amplifiers.

Referring again to FIG. 1, an applied signal of bandwidth $f_1$ to $f_3$ is applied to port 1 of the four-port filter 10. It is a property of filter 10 that it divides the signal into two, partially overlapping subbands. One of these subbands, extending between frequencies $f_1$ to $f_2$, is coupled to wavepath 12 by way of port 2. The other subband, extending between frequencies $f_2$ to $f_3$, is coupled to wavepath 13 by way of port 3.

It is understood that the designations $f_1$, $f_2$ and $f_3$ to define the limits of the various frequency bands are merely arbitrary designations. Typically, the bandwidth of a signal is defined by its half-power points. It is, however, recognized that the frequency spectrum for each subband extends beyond these designated frequencies. In particular, there is an overlapping of the subbands about frequency $f_2$ such that significant energy at the same frequencies is included in both subbands. It is, thus, apparent that if the signal is to be recombined in a manner to reproduce at the output a true replica of the input signal, the system must operate upon the two subbands in a manner to maintain phase coherency. Before proceeding with a discussion of this aspect of the problem, some further discussion of symmetric four-port filters, and their properties, is required.

A bisymmetric four-port filter has the property that $$S_{11}=S_{14}=0 \qquad (1)$$

and $S_{12}$ and $S_{13}$ have a constant 90 degree phase difference over the entire frequency range, where $S_{11}$, $S_{12}$, $S_{13}$ and $S_{14}$ are the transmission coefficients between the respective ports designated by the subscript pairs.

Equation 1 states that when matched, no power is reflected back to port 1 ($S_{11}=0$), and that no power is coupled between port 1 and port 4 ($S_{14}=0$). The total power, therefore, is transported to the other two ports.

The terms $S_{12}$ and $S_{13}$ are, in general, frequency sensitive and, indeed, characterize the filtering characteristic sought. Whatever portion of the frequency band is rejected by one, is passed by the other. Assuming no appreciable loss within the filter itself, the conservation of energy requires that $$|S_{12}|^2+|S_{13}|^2=1 \qquad (2)$$

Equation 2, in effect, states that all the incident power is divided between ports 2 and 3.

Figure 2:
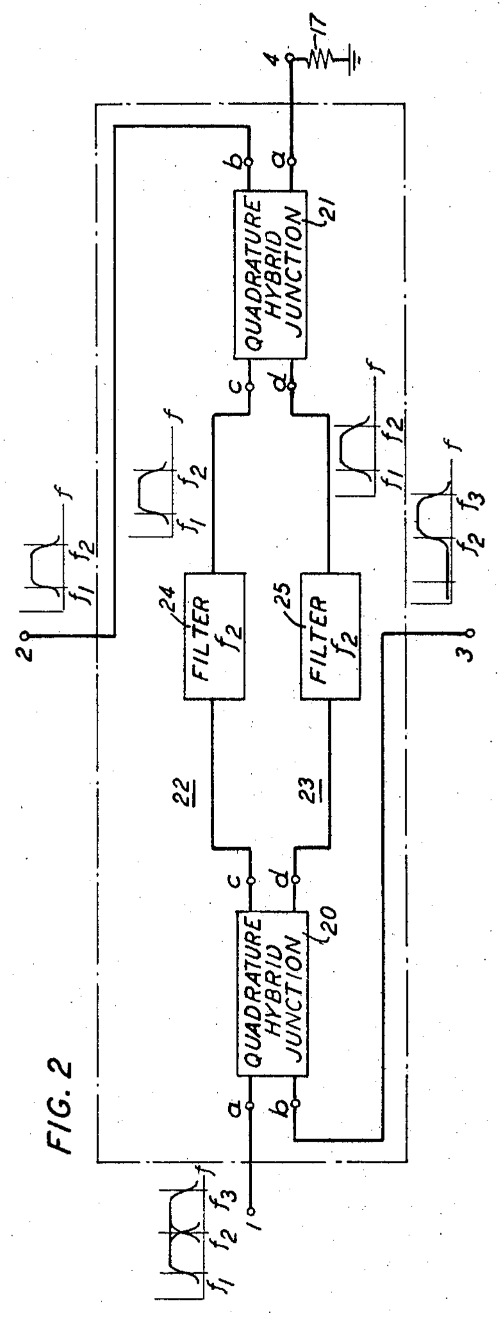
FIG. 2 is a block diagram of one embodiment of a bisymmetric four-port filter.

A filter having these prescribed properties can be synthesized in many ways. A block diagram, illustrating all of the necessary elements of such a filter, is shown in FIG. 2. Basically, it comprises two quadrature hybrid junctions 20 and 21, connected by means of two substantially identical wavepaths 22 and 23, each of which contains a two-port bandpass filter 24 and 25 respectively. The two-port filters 24 and 25 are the same, and are designed to have a cut-off frequency $f_2$ that falls somewhere within the frequency band occupied by the input signal.

The term "quadrature hybrid junction" refers to that class of power dividers having four ports, arranged in pairs, in which the ports comprising each pair are conjugate to each other and in coupling relationship to the ports of the other pair. In general, the power division ratio of a hybrid junction is a matter of design. However, as commonly used, the term generally refers to a 3 db power divider in which the power incident to one port of one pair of conjugate ports divides equally between the other pair of conjugate ports. In addition, in the quadrature hybrid junction, the two divided signal components are ninety degrees out of time phase with respect to each other. Illustrative of such devices are the Riblet coupler and the multihole directional coupler.

Referring again to FIG. 2, ports $a$ and $b$ and ports $c$ and $d$ constitute the two pairs of conjugate ports of quadrature hybrid junctions 20 and 21. Of these, wavepath 22 interconnects ports $c$ of the two junctions, whereas wavepath 23 interconnects ports $d$ of the two junctions. Port $a$ of hybrid 20, which is the input port, corresponds to port 1 of coupler 10 of FIG. 1. Port $b$ of hybrid 21, which is one of the output ports, corresponds to port 2 of coupler 10, and port $b$ of junction 20, which is a second output port, corresponds to port 3 of coupler 10. Port $a$ of hybrid 21 corresponds to port 4 of coupler 10 and, as in FIG. 1, is terminated by resistor 17.

In operation, a signal of bandwidth $f_1$ to $f_3$ is applied to port $a$ of hybrid 20 wherein it is divided into two components of equal amplitude in ports $c$ and $d$. These two components travel towards hybrid 21. However, because of the presence of filters 24 and 25, only the portion of the signal between frequencies $f_1$ and $f_2$ reaches the second hybrid where they recombine in port $b$. That portion of the signal between frequencies $f_2$ and $f_3$ is reflected back towards hybrid 20 wherein it recombines, and leaves by way of port $b$. In addition, there is a ninety degree phase difference between the signals leaving port $b$ of junction 21 and port $b$ of junction 20. Thus, the network of FIG. 2 is, in all respects, the equivalent of the band-splitters 10 and 11 of FIG. 1.

Having divided the incident signal into two, partially overlapping subbands, it is now possible to operate upon the subband independently. In the illustrative embodiment of FIG. 1, amplifiers 14 and 15 are included in the respective wavepaths 12 and 13 for this purpose. It is understood, however, that other signal processing devices, such as delay lines, for example, can be used, and that the use of amplifiers in FIG. 1 is merely by way of illustration.

In order to maintain phase coherency, it is necessary that the two wavepaths 12 and 13, including amplifiers 14 and 15, have the same phase delay over that portion of the frequency spectrum common to both subbands. This typically is an easy requirement to satisfy.

Following amplification, the two subbands are recombined in port 1 of filter 11.

It can readily be shown that Equation 2 can be rewritten as $$|S_{12}^2-S_{13}^2|=1 \qquad (3)$$

Applying the principle of reciprocity, namely that $S_{12}=S_{21}$, and $S_{13}=S_{31}$, it is seen that the circuit of FIG. 1 provides transmission from port 1 of band-splitting filter 10 to port 1 of the band-recombining filter 11 (through wavepath 12) that is equal to $S_{12}\cdot S_{21}=S_{12}^2$. Similarly, the transmission from port 1 of band-splitting filter 10 to port 1 of band-recombining filter 11 (through wavepath 13) is equal to $S_{13}\cdot S_{31}=S_{13}^2$. The presence of phase shifter 16, however, introduces a 180 degree phase shift which changes the sign of $S_{13}^2$ to $-S_{13}^2$. Thus, the recombined signal at port 1 of coupler 11 has a magnitude $|S_{12}^2-S_{13}^2|$ which, from Equation 3, is equal to unity. Thus, it is seen that the circuit of FIG. 1 possesses band-splitting properties, and that the incident power, which is transmitted in two subbands, recombines without any loss of energy in the overlapping regions.

Figure 3:
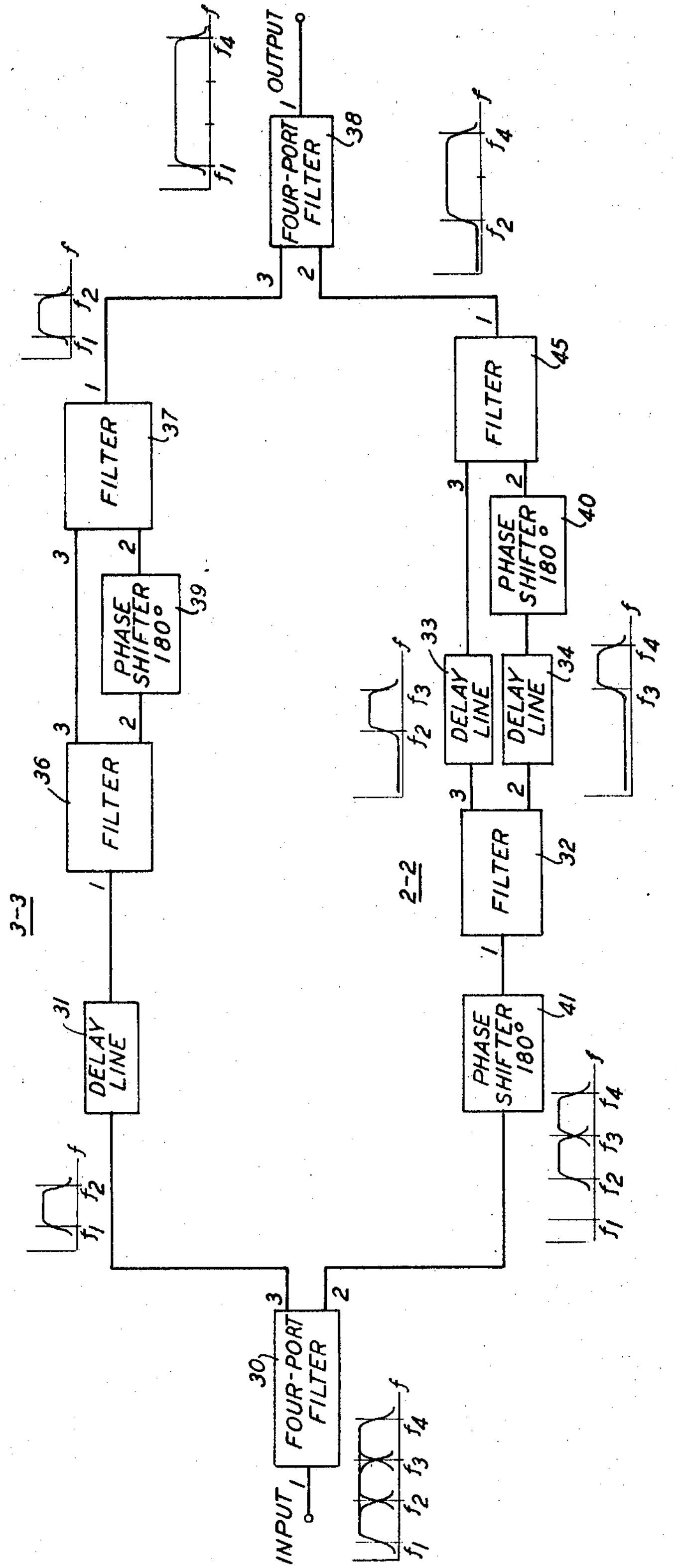
FIG. 3 is a three-fold band-splitting and recombining network.

The principles of the invention can be extended to include a larger number of phase-coherent subbands. As an example, a three-fold band splitter is illustrated in FIG. 3. This embodiment of the invention comprises an input band-splitting filter 30 and a substantially identical band-recombining filter 38. These two filters, being the same, have the same frequency characteristics. Each of the wavepaths 3—3 and 2—2 between filters 30 and 38 include therein a second pair of four-port filters 32 and 35, and 36 and 37. These latter four filters are substantially identical to each other but different than filters 30 and 38.

In operation, an input signal, which extends over the frequency range between $f_1$ to $f_4$, is divided into two subbands in the input filter 30. One subband, $f_1$—$f_2$, passes through some signal-processing element, such as an acoustic grating dispersive delay line 31, while the remaining subband $f_2$—$f_4$ is applied to one of the second group of filters 32, which further splits subband $f_2$—$f_4$ into two separate subbands $f_2$—$f_3$ and $f_3$—$f_4$. The two subbands $f_2$—$f_3$ and $f_3$—$f_4$ are caused to pass through delay lines 33 and 34, respectively, and are then recombined in filter 35 to reform the combined subband $f_2$—$f_4$.

In order to preserve the phase delay in the two subbands $f_1$—$f_2$ and $f_2$—$f_4$, the pair of filters 36 and 37 (without delay lines) is added to wavepath 3—3 between input filter 30 and output filter 38. Filters 36 and 37 are included solely for the purpose of maintaining the requisite phase delay in the two subbands $f_1$—$f_2$ and $f_2$—$f_4$. In this manner, the recombined signal derived from filter 38 will include, without any loss of energy due to phase incoherency, all of the energy associated with the frequency components within the two subbands.

The 180 degree phase shifters 39 and 40 are included between pairs of filters 36–37 and 32–35 to satisfy Equation 3. A third 180 degree phase shifter 41 is included between filters 30 and 38 for the same purpose. In a waveguide system, a broadband 180 degree phase shift can be obtained by the simple expedient of introducing a half twist to the waveguide. In two conductor transmission systems, a broadband transformer of the type described by C. L. Ruthroff in United States Patent 3,037,175 can be used. Alternatively, the 180 degree phase shift can be built directly into one of the other circuit components, and need not be a separate element.

Figure 4:
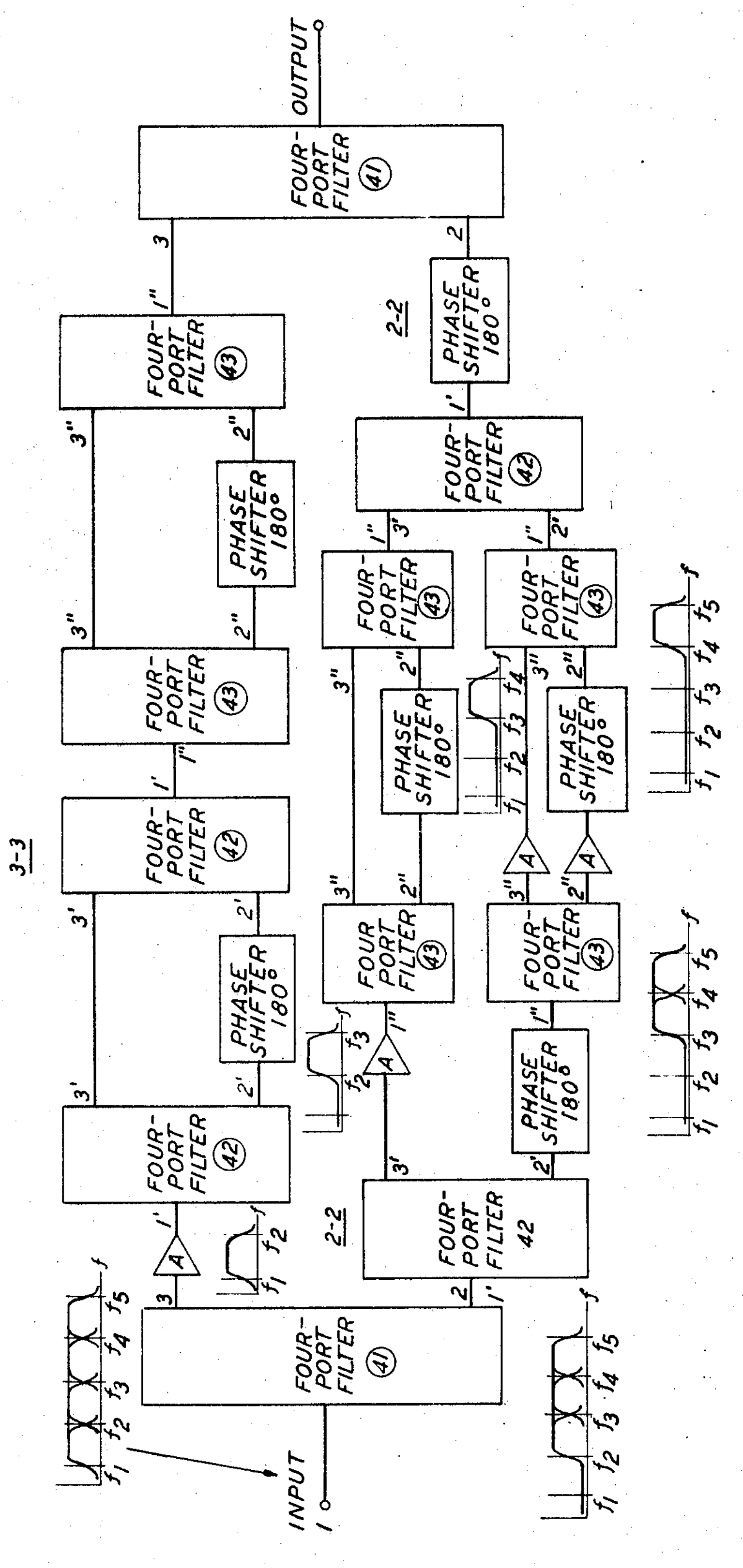
FIG. 4 is a four-fold network.

FIG. 4 is an extension of the invention to an application wherein the input signal is divided into four subbands. In this figure, the circled numbers 41, 42 and 43 within the blocks are used to identify the various filter pairs having the same band-splitting and band-recombining properties. As was explained in connection with FIG. 3, in order to insure phase coherency for all frequencies, the two wavepaths 3—3 and 2—2 connecting the input and output filters must have the same phase delay for all frequency components common to the two subbands. It is obvious that this is a particularly important consideration with respect to adjacent subbands which share an overlapping region which includes frequency components of significant amplitude.

In FIG. 4 the input signal is to be divided into four subbands $f_1$-$f_2$, $f_2$-$f_3$, $f_3$-$f_4$ and $f_4$-$f_5$, of which subband $f_1$-$f_2$ passes through branch 3—3 between the pair of number 41 filters, while the remaining three subbands pass through the other wavepath 2—2 connecting these two filters. Following the initial band splitting $f_1$-$f_2$ and $f_2$-$f_5$ in a number 41 filter, there is a further subdivision in wavepath 2—2 in a number 42 filter, which divides out subband $f_2$-$f_3$, and, finally, a further subdivision in a number 43 filter which forms subbands $f_3$-$f_4$ and $f_4$-$f_5$. Since the latter two subbands are adjacent subbands, they include a common overlapping region and, hence, a pair of number 43 fiters are also included in wavepath 3′—3′ between the pair of number 42 filters to balance the pair of number 43 filters in wavepath 2′—2′ between the number 42 filters. Since the 2—2 wavepath includes a pair of number 42 filters, and the equivalent phase shift of a pair of number 43 filters, a phase-balancing pair of number 42 filters and a phase-balancing pair of number 43 filters are also included in the 3—3 wavepath. It will be noted, however, that the number 43 filters operate on subbands $f_3$-$f_4$ and $f_4$-$f_5$ which are not adjacent to the $f_1$-$f_2$ subband which propagates through wavepath 3—3. Because they are not adjacent subbands, the number 43 filters have very little effect upon the phase dispersion of any of the frequency components within subband $f_1$-$f_2$.

Figure 5:
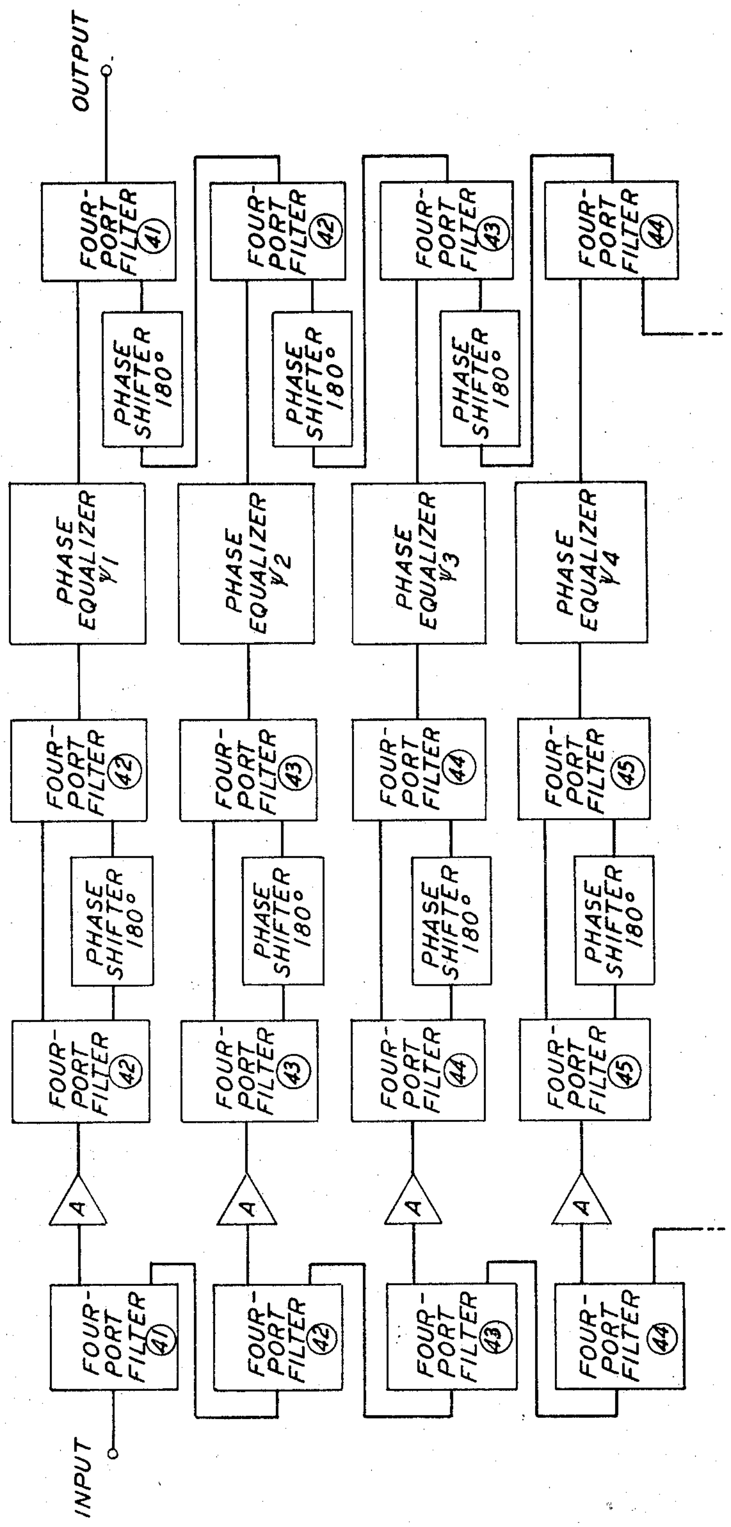
FIG. 5 is an approximately coherent N-section band divider.

However, the time delay, and more secondary effects of these filters must be accounted for. This can be done to an adequate degree by the substitution of a low order network to approximate the off-band performance of the nonadjacent subband filter-pairs, thus realizing a drastic cost and size reduction in a large, phase-coherent multiplex system. The resuting simplification of the circuit is illustrated in FIG. 5, which is an approximately coherent, N-section band splitter in which the accumulated phase distortion introduced by all nonadjacent subband filter-pairs is accounted for by means of a suitable phase equalizer. As can be seen in FIG. 5, exact phase equalization is only provided by adjacent subband filter-pairs, i.e., number 42 filter-pairs following a number 41 filter, et cetera. All other phase equalization is provided, approximately, by means of phase equalizers $\psi_1$, $\psi_2$. . . .

Figure 6:
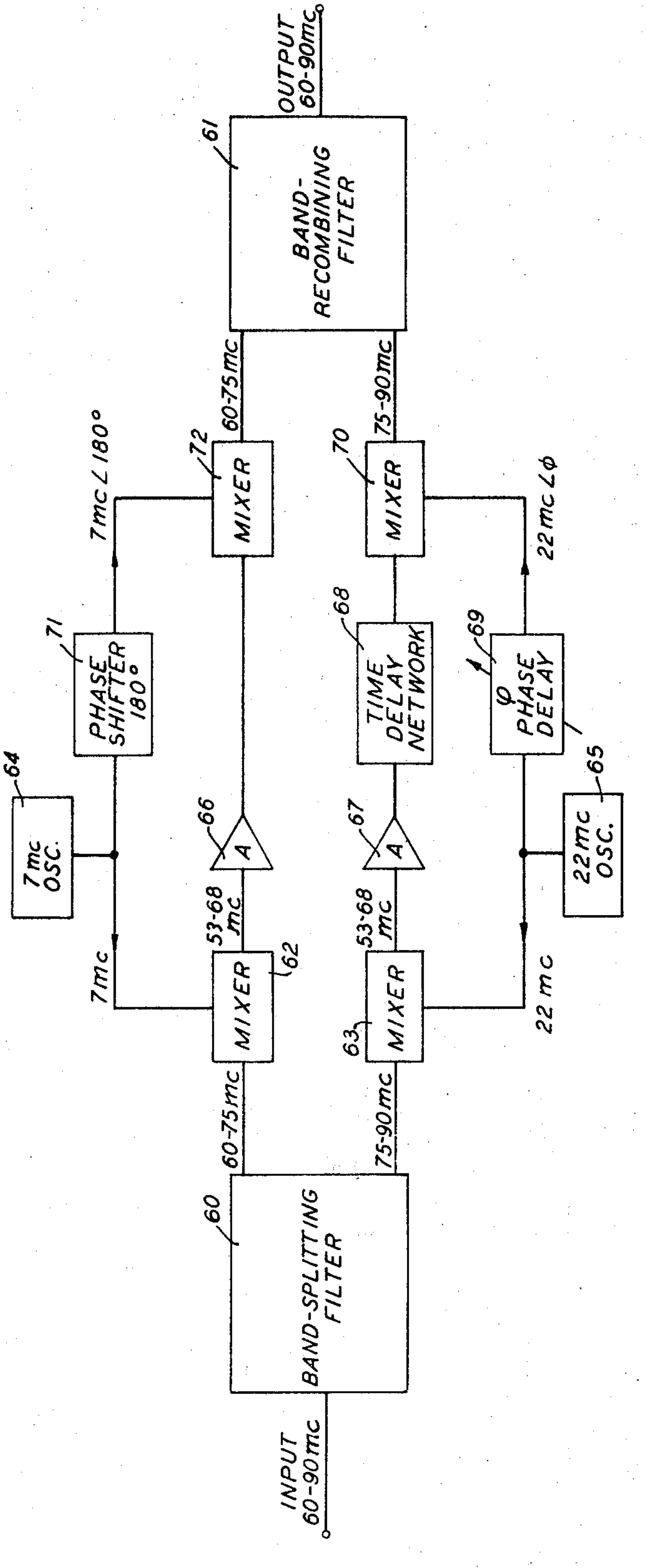
FIG. 6 is a band-splitting and recombining network including frequency conversion techniques for converting all sidebands to the same frequencies.

In the several illustrative embodiments of the invention described hereinabove, the signal processing devices (amplifiers and delay lines) are tuned to different portions of the frequency spectrum corresponding to the several subbands. In some applications, however, it may be advantageous to use the same signal processing device for all subbands. In the embodiment of FIG. 6, to be described below, coherent frequency conversion techniques are used to this end.

FIG. 6 comprises a pair of band-splitting filters 60 and 61 for dividing the incident signal into two subbands. For purposes of illustration and explanation, a 60-90 mc. signal is divided into two overlapping subbands of 60-75 mc. and 75-90 mc. In the absence of any further signal processing. it would require two amplifiers, tuned to the two different frequency ranges, to amplify the two subbands. To avoid using two different amplifiers, the subbands are made to undergo a heterodyning process in the two mixers 62 and 63 which down-convert them to the same frequency band 53-68 mc. To accomplish this, a 7 mc. signal, derived from a 7 mc. oscillator, is applied to mixer 70. In a similar manner, the 180 degree phase shift mc. signal, derived from a 22 mc. oscillator 65, is applied to mixer 63 along with the 75-90 mc. subband. The two 53-68 mc. subbands can now be amplified by means of two similar amplifiers 66 and 67.

Prior to reconverting back to the original frequencies, the time delays for the two subbands must be corrected. If the delay characteristic (time versus frequency) for the two wavepaths has a slope given by $dt/df$, then the delay of the down-converted 75-90 mc. subband must be corrected by an additional delay that is equal to the difference in the actual delay experienced by the 75-90 mc. subband at the down-converted frequency, and the delay it would have experienced if amplification had taken place at the original subband frequencies. Since the conversion difference for the two subbands is 15 mc., a time delay network 68 is included in the 75-90 mc. channel for the purpose of adding a fixed time delay $\tau$ equal to 15 $dt/df$.

With the equalization of the time delay, there may still remain a need for a compensating phase shift between the wave energy in the two subbands. This can be provided by a phase shifter 69 which adds an extra $\varphi$ degrees to the 22 mc. local oscillator signal fed to the upconverting mixer 70. In a similar manner, the 180 degree phase shift provided previously by a phase shifter in one of the wavepaths connecting the two band-splitting filters is now provided by a phase shifter 71 in the local oscillator circuit which adds a 180 phase shift to the 7 mc. local oscillator signal fed to the upconverting mixer 72. Mixers 70 and 72 restore the subbands to their original frequencies prior to recombination in output filter 61.

The converter multiplexer of FIG. 6 can be extended to an N-section band-splitter in a fashion completely analogous to the method used to arrive at the embodiment of FIG. 5. A converter multiplexer has the advantage over the simple band-splitter that only one signal processing device need be designed to cover any arbitrarily wide frequency band, and that the relatively narrow band over which signal processing occurs can be chosen at a center frequency of convenience. In addition, the 180 degree phase shifter 71 need only be designed to operate at a single frequency rather than over a band of frequencies. This technique, however, has the disadvantage of additional complication and higher insertion loss.

It was noted earlier that there are two classes of four-ports. In the discussion herein above, we have considered the so-called "quadrature" four-port. It should be noted, however, that all of the illustrative embodiments hereinbefore considered can just as readily be implemented using the so-called "in phase" or "180 degree" four-ports. The embodiments are in all respects the same except that the additional 180 degree phase shift, added to one of the wavepaths connecting pairs of four-ports, is eliminated.

An example of a zero or 180 degree band-splitting filter is given in United States Patent 2,531,419. In accordance with the present invention, band-splitters of this type, or any other type, can be substituted for the quadrature band-splitting filter used in the illustrative embodiments described above. Thus, in all cases it is understood that the above-described arrangements are illustrative of only a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In an electromagnetic wave transmission system propagating wave energy over a given band of frequencies, a band-splitting and recombining network comprising:

band-splitting means for dividing said wave energy into two subbands;

band-recombining means for recombining said two subbands;

a first wavepath for transmitting one of said subbands between said band-splitting and recombining means;

a second wavepath for transmitting the other of said subbands between said band-splitting and recombining means;

characterized in that said two subbands are partially overlapping to include frequency components in common;

and in that the overall relative phase shift for said common frequency components in propagating through said network is approximately zero.

2. The network according to claim 1 wherein said band-splitting and band-recombining means are substantially identical matched, lossless four-port filters.

3. The network according to claim 1 wherein said band-splitting and band-recombining networks are substantially identical lossless, bisymmetrical four-port filters.

4. The network according to claim 1 including means within at least one of said wavepaths for dividing at least one of said subbands into additional smaller subbands and for recombining said additional subbands.

5. The network according to claim 1 wherein each of said wavepaths includes signal processing means for operating upon said subbands.

6. The network according to claim 1 including signal mixing means for shifting the original frequencies of said two subbands to a common frequency band and for shifting the frequency of said subbands from said common frequency band to their original frequencies.

7. A phase-coherent band-splitting and recombination circuit operative over a prescribed frequency band comprising:

band-splitting and band recombining networks each having a bandpass characteristic $S_{12}$ between a first branch and a second branch, and a bandpass characteristic $S_{13}$ between said first branch and a third branch such that $|S_{12}^2-S_{13}^2|=1$, and where each bandpass is less than said prescribed band;

a first wavepath connecting the second branch of said first network to the second branch of said second network;

a second wavepath connecting the third branch of said first network to the third branch of said second network;

characterized in that said bandpasses are partially overlapping so as to include common frequency signal components;

and in that the relative phase shift between said common frequency signal components upon propagating through said two wavepaths is equal to 180 degrees.

8. The circuit according to claim 7 including amplifying means disposed in each of said wavepaths.

9. The circuit according to claim 7 including delay means disposed in each of said wavepaths.

10. In combination:

a broadband signal source;

a network comprising;

means for successively dividing broadband signal wave energy derived from said source into a plurality of subbands of reduced bandwidth;

signal processing means for operating upon said plurality of subbands;

and means for successively recombining said subbands to recover said broadband signal wave energy;

characterized in that adjacent subbands are partially overlapping so as to include frequency components in common;

and in that the total relative phase shift experienced by the respective frequency components common to pairs of overlapping subbands upon propagating through said network is approximately zero.

References Cited

UNITED STATES PATENTS

| | | | |
|---|---|---|---|
| 3,060,390 | 10/1962 | Brewer | 330—124 X |
| 3,112,452 | 11/1963 | Kirkpatrick | 330—124 X |
| 3,202,928 | 8/1965 | Prior | 330—124 |
| 3,202,927 | 8/1965 | Ishimoto et al. | 330—124 X |
| 3,248,663 | 4/1966 | Jacob | 330—124 |
| 3,348,163 | 10/1967 | Hirst | 330—124 X |

NATHAN KAUFMAN, *Primary Examiner.*

U.S. Cl. X.R.

330—53